Feb. 5, 1946.                P. MARKOWITZ                2,394,459
                             JUICE EXTRACTOR
                            Filed July 2, 1943
FIG. 1.
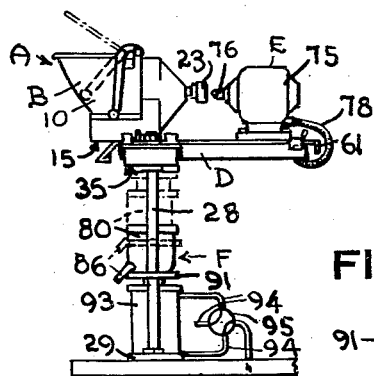
FIG. 3.
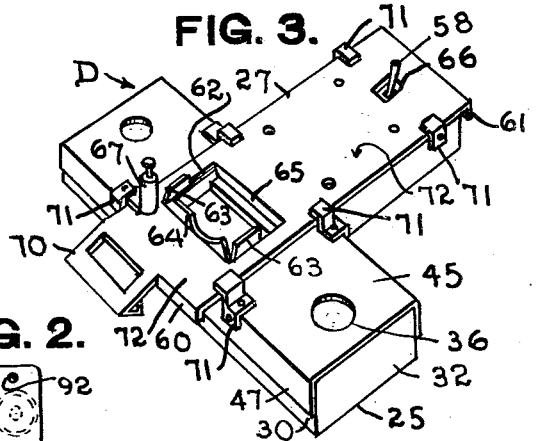
FIG. 2.
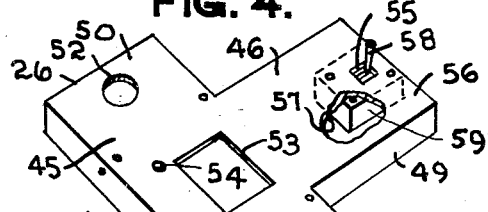
FIG. 4.
FIG. 5.
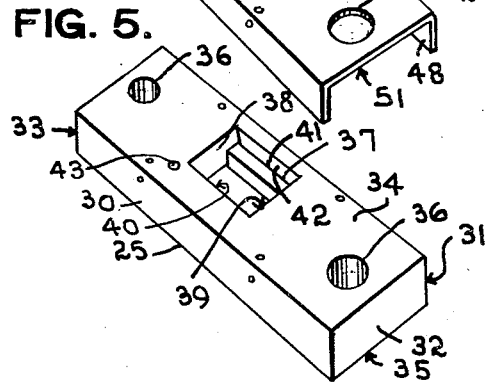
FIG. 6.
FIG. 7.
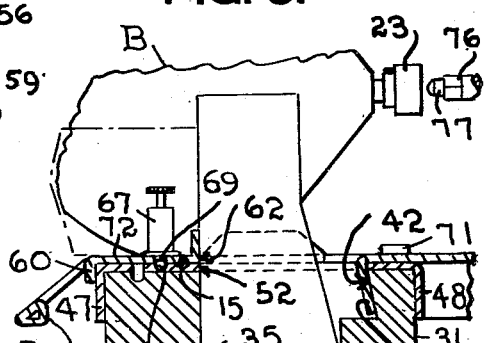
FIG. 8.    FIG. 9.
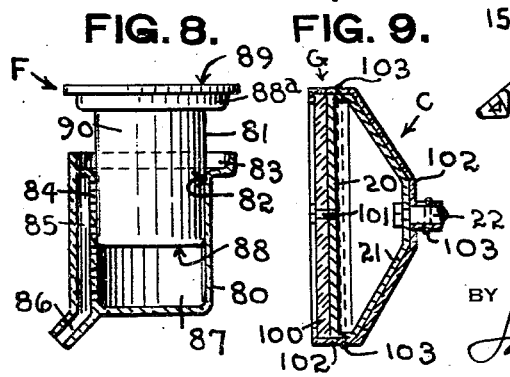
INVENTORS.
Phillip Markowitz
BY
Lancaster, Allwine & Rommel
ATTORNEYS.

Patented Feb. 5, 1946

2,394,459

UNITED STATES PATENT OFFICE 2,394,459

JUICE EXTRACTOR

Phillip Markowitz, Homestead, Fla.

Application July 2, 1943, Serial No. 493,268

4 Claims. (Cl. 146—76)

This invention relates to juice extractors.

The primary object of the invention is to provide a sanitary extractor, readily manipulated by hand, and adapted to extract juice from fruits and vegetables with a minimum of operations.

Another important object is to provide, in a juice extractor, a support for a trituration apparatus, means for connecting this apparatus with a prime mover, and means for squeezing the juice from the triturated material, all contained in a compact, readily-inspected and easily cleaned assembly.

Still another important object is to provide an especially sanitary take-apart assembly wherein the portions of the assembly coming into contact with triturated material, residues and juices, may be readily emptied and cleaned.

Yet another object is to provide a novel juice extractor, wherein parts of the extractor have dual functions.

Another object is to provide a novel sanitary covering for metallic portions of conventional triturating apparatus.

Other objects and advantages of this invention will be apparent during the course of the following detailed description, taken in connection with the accompanying drawing and in which drawing:

Figure 1 is a side elevation of the novel extractor.

Figure 2 is a top plan of a portion of the juice squeezing means.

Figure 3, 4, and 5 are perspective views on a larger scale of portions of a novel support means forming a part of the extractor.

Figures 6 and 7 are fragmentary sections on a still larger scale showing two positions of parts of the operating assembly of the extractor.

Figure 8 is a view partly in vertical section and partly in elevation of a portion of the juice squeezing means.

Figure 9 is a vertical section through a portion of a metallic grinding means, rendered sanitary by a protective covering.

In the drawing, wherein for the purpose of illustration is shown a preferred embodiment of the invention and wherein similar reference characters designate corresponding parts throughout the several views, the letter A may designate generally the extractor; B, a container for the grinding means C for triturating juice-containing material; D, a support for the container B; E, means for operating the grinding means C; F, means for receiving triturated material from B and squeezing juice therefrom; and G, means for rendering the grinding means sanitary.

The container B is of conventional construction and includes a hopper portion 10 leading to a downwardly-opening discharge way 11, having side walls 12 and 13 and end walls 14. The side wall 13 is the rearmost and flares or slopes downwardly and outwardly from the side wall 12, as shown in Figure 7. These walls 12, 13 and 14 extend below the general bottom 15 of the hopper 11. Preferably, the container B is of a hardened plastic, which may be transparent.

Grinding means C may also be of conventional construction and include a grinding wheel or disc 20 within the hopper 11, rotating on a substantially horizontal axis, supported by a carrier or rotor 21, mounted upon a spindle 22, for rotation. The spindle 22 extends through the rear wall of the container B and may be provided with a socket member 23 at its free end, exteriorly of the container B, the member 23 having an outwardly-opening conical socket 24. In conventional construction, the grinding wheel is usually of stone or Carborundum and the carrier 21 and spindle 22 of metal.

Now as for the support D for the container B, this is of novel construction and includes a rectangular stationary member 25 shown particularly in Figure 5, a substantially T-shaped stationary member 26, mounted upon the member 25, and shown particularly in Figure 4, a slidable plate member 27, shown particularly in Figure 3, mounted upon the member 26, legs 28, supporting the members 25 and 26, and a base 29 for the legs 28.

The rectangular stationary member 25 is provided with vertical front and rear faces 30 and 31 vertical end faces 32 and 33 and flat top and bottom faces 34 and 35 and may be a solid block of material, such as wood. Adjacent the end faces 32 and 33 there are two perforations 36 from the face 34 to the face 35 for the upper ends of the legs 28 and centrally of the end faces 34 and 35 is a slot or opening 37, having substantially vertical end faces 38 and 39, one substantially vertical side face 40 and a stepped side face 41 opposite the face 40. The upper section 42 of this side face 41 extends downwardly away from the face 40 as shown in Figures 5 to 7. Forwardly of the slot 37 is a socket 43. The bottom face 35 has a function to be subsequently explained.

The T-shaped stationary member 26, may comprise a sheet of suitable material, fashioned into a front section 45 and a rear section 46, joining the front section, with the section 45 mounted upon the member 25 and having downturned side flanges 47 and 48, and the rear section may have opposite downturned end flanges 49. Extending from the upper face 50 to the lower face 51 of the section 46 is a centrally-disposed slot or opening 53 aligning with the slot 37, two perforations 52, aligning with the perforations 36 a perforation 54, aligning with the socket 43 and adjacent the far side of the rear section 46 may be a slot 55 extending from the upper face 56 to the lower face 57, to accommodate the handle 58 of a conventional toggle electric switch 59 mounted upon the underside of the section 46 in any approved way. The upper faces 56 and 57 are preferably smooth.

As for the slidable plate member 27, this is disposed with its longitudinal axis normal to the longitudinal axis of the member 25 and is mounted for sliding over the faces 50 and 56. It has down-turned front and rear flanges or stops 60 and 61, a slot or opening 62 sometimes aligning with the slots 37 and 53 and having upturned parallel flanges or guides 63 and a front flange or guide 64 providing with an arcuate cut out for accommodating an arcuate lower portion of the container B. At the rear of the slot 62 is a flange 65 which slopes downwardly and rearwardly, as in Figures 6 and 7. There is also a rearwardly-disposed slot 66 adapted to align with the slot 55, but not always aligned therewith, as will be subsequently explained. The handle 58 extends through this slot 66. Mounted upon the plate member 27 is a latch means 67 including a plunger 68 adapted to be spring-urged into the socket 43 and otherwise retained in an inoperative position within the perforation 69 in the plate member 27 with its end in contact with the upper face 56. Projecting outwardly from the front end of the slidable member 27 is a suitable handle 70 which may be a continuation of the material forming the plate member, shaped as shown in Figures 3, 6, and 7. The length of the slidable member 27 is greater than that of the stationary member 26, measured from front to rear thereof. Suitable guides 71 may be provided, mounted upon the stationary member 26, to guide the sliding of the member 27. Except for the flanges 63 and 64 the upper face 72 of the slidable plate member 27 is smooth and flat.

The legs 28 are, preferably, two in number, of smooth exterior and tubular construction, have any suitable means to secure them at their upper ends to the members 25 and 26 and any suitable means to secure them to the base 29.

The means E for operating the grinding means C may be a prime mover, such as an electric motor 75, mounted firmly upon the rearward portion of the slidable plate 27 intermediate the slots 62 and 66, and has a shaft 76 provided with a conical end 77 adapted to enter the socket 24 and grip the walls thereof for rotation of the socket member 23, spindle 22, carrier 21 and grinding wheel 20. Extending from the motor 75 to the switch 59 is a suitable conductor 78 of electricity.

At this point, coaction and operation of the elements B, C, D and E will be explained. The container B is adapted to rest upright and in an operative position upon the upper face 72 of the slidable plate member 27 of the support C, and with the discharge way 11 in the slots or openings 37, 53 and 62, as shown in Figures 6 and 7. It will be noted that the lower end of the side wall 13 abuts the lower end of the rear wall of the slot 37 and that the opposite side wall 12 is in contact with a wall of the slots 37 and 52. The flanges or guides 63 assist in guiding the way 11 into the slots. Preferably, when the parts are as shown in Figure 6, the container B may be bodily lifted from the support D for cleaning or other purposes. However, when the slidable plate member 27 is drawn or pulled forwardly, so that the downturned flange 65 engages the wall 13 of the discharge way 11, as shown in Figure 7, the container B cannot be removed and is held against undesirable vibrations when the grinding means C is in operation. Drawing or pulling the plate member 27 forwardly completes two other operations: it moves the motor 75 forwardly so that the conical end of the shaft 77 thereof enters the socket member 23 and grips the walls thereof as explained, and the forward motion also closes the electric circuit of the toggle switch 59, when the rear wall of the slot 66 engages the switch handle 58 and draws it forwardly, so that current will flow from any suitable source of electricity, through the switch 59 through the conductor 78, to the windings of the motor 75, through conductor 78, switch 59 and to the source. Pushing back the slidable plate 27 will, of course, uncouple the motor and grinding means and open the electric switch as is now apparent. The latch means 67 functions to retain the slidable plate 27 in its forward position (when the plunger 68 enters the socket 43 of the stationary member 25) until hand unlatched, as is apparent. Triturated material drops through the way 11 and enters the means F which will be next described.

The means F for receiving triturated material and squeezing the same to extract juice includes two preferably transparent glass or plastic members 80 and 81, shown particularly in Figure 8. The first is a vessel having an open mouth 82 and, preferably, an outwardly and upwardly extending rim 83, a perforated vertical wall section 84 provided with substantially horizontally-disposed perforations, a vertical way 85 extending from this wall section 84 and a juice discharge nozzle or spout 86 communicating with the way 85 at the bottom thereof, as shown in Figure 8. Material from the way 11 drops into the chamber 87 in the vessel member 80, whereupon the member 81, which is a plunger, is inserted into the vessel member 80. The member 81 has a flat bottom 88, a flange 88ª at its upper end, adapted to cooperate with the rim 83, and a flat upper face 89. The body 90 of the plunger member 81 fits snugly but slidably in the chamber 87. The member 80 is removably disposed upon a substantially horizontal platform 91 which has a pair of perforations 92 through which the legs 28 extend, so that the platform 91 may move upwardly and downwardly. For raising and lowering the platform 91, any suitable means may be provided, as a conventional hydraulic or air lift 93 with fittings 94 and conventional four-way valve 95. With the triturated material in the vessel member 80 and the plunger member 81 also in the member 80, with its bottom 88 resting upon the material, when the platform 91 is raised, the upper face 89 will contact the bottom face 35 of the stationary member 25 and continued upward movement of the platform 91 will force the plunger member 81 downwardly upon the material and squeeze the juice therefrom, which will flow through the perforations in the wall section 84, way 85 and out of the spout 86 whereupon the members 81 and 90 are lowered.

So that the conventional grinding apparatus may be rendered more sanitary, there may be provided the means G shown in Figure 9. This comprises a plastic (or non-metallic) grinding wheel 100 adapted to fit over the conventional wheel 20 and secured thereto by a non-metallic screw 101 and a formable plastic housing or casing 102 for the carrier 21 and portion of spindle 22 within the hopper portion 10, secured to the conventional metallic carrier and spindle as by strong rubber bands 103.

From the foregoing it may be seen that the container B and the members 80 and 81 may be readily removed for cleaning that, otherwise, especial emphasis has been laid on sanitation, yet a compact and readily operated assembly has been provided, either for counter use or for larger-scale production of fruit and vegetable juices.

Various changes in the shape, size and arrangement of parts may be made to the form of invention herein shown and described, without departing from the spirit of the invention or the scope of the following claims.

What is claimed is:

1. In a juice extractor, means for triturating juice-containing material, including a grinder apparatus, a container for said grinder apparatus and material, having four walls defining a downwardly-opening discharge way, one of said walls extending diagonally away from its facing wall; a support for said container, including a stationary portion having an opening aligning with said discharge way, and with the lower portions of said walls disposed snugly within said opening, and a horizontally-reciprocable portion carried upon said first-named portion and provided with an opening through which said walls extend, portions of the under side of said container being in frictional engagement with the upper face of said horizontally-reciprocable portion; means for releasably retaining said container against vertical movement, including a downturned wall extending diagonally from said reciprocable portion, disposed within said first-named opening, facing said first-named diagonal wall, and slidable with said reciprocable portion into and out of contact with said first-named diagonal wall; and means for operating said grinding apparatus, including a prime mover rigidly mounted upon said horizontally-reciprocable portion and having a shaft movable, upon reciprocation of said horizontally-reciprocable portion, into engagement with said apparatus, as said down-turned wall moves into contact with said first-named diagonal wall.

2. In a support for a device having a discharge mouth extending below the general bottom of the device, with one wall of said mouth diverging downwardly and away from the other walls thereof, a stationary support member, having a slot accommodating said mouth with the walls of said mouth abutting at least portions of the walls of said slot, said diverging wall abutting a wall of said slot at adjacent the bottom of said diverging wall, legs for said stationary support member, a slidable support member having a slot accommodating said walls of said mouth, and a downturned flange facing and paralleling said diverging wall and normally spaced therefrom, said slidable support adapted to support said device, and means for moving said slidable support member forwardly and rearwardly, with said device stationary, so that said flange will engage said diverging wall when said slidable member is moved forwardly and disengage said diverging wall when moved rearwardly.

3. In a duel support for an electric motor having a shaft, and a device having a housing containing a rotor provided with a spindle having means for coupling said shaft thereto, and having a discharge way extending below the general bottom of the housing and provided with an outwardly flaring wall, a stationary support member having a slot accommodating said way, a slidable support member, mounted upon said stationary support member, for forward and rearward oscillation, having a slot accommodating said way, with the remainder of said device above said slidable support member, and a flange extending downwardly into both of said slots and flaring in a direction to face and parallel said flaring wall, said flange being normally spaced from said wall, said slidable support member having said motor fixedly mounted thereon to the rear of said device, with the axes of rotation of said shaft and spindle aligned, with said shaft and said coupling means normally spaced apart; and means for oscillating said slidable support member with said device stationary, so that said flange will move into engagement with said flaring wall and said coupling means and said shaft will couple when said slidable support member is moved forwardly, and said flange will move away from said flaring wall and said coupling means and shaft will uncouple when said slidable support member is moved rearwardly.

4. In a dual support for an electric motor having a shaft, and a device having a housing containing a rotor provided with a spindle having means for coupling said shaft thereto, and having a discharge way extending below the general bottom of the housing and provided with an outwardly flaring wall, a stationary support member having a slot accommodating said way; an electric switch mounted upon the bottom of said stationary support; an electric conductor between said switch and said motor; a slidable support member, mounted upon said stationary support member, for forward and rearward oscillation, having a slot accommodating said way, with the remainder of said device above said slidable support member, and a flange extending downwardly into both of said slots and flaring in a direction to face and parallel said flaring wall, said flange being normally spaced from said wall, said slidable support member having said motor fixedly mounted thereon to the rear of said device, with the axes of rotation of said shaft and spindle aligned, with said shaft and said coupling means normally spaced apart; lever means for opening and closing said switch upon oscillation of said slidable support member; and means for oscillating said slidable support member with said device stationary, so that said flange will move into engagement with said flaring wall, said lever means will close said switch, and said coupling means and said shaft will couple when said slidable support member is moved forwardly, and said flange will move away from said flaring wall, said lever means will open said switch, and said coupling means and shaft will uncouple, when said slidable support member is moved rearwardly.

PHILLIP MARKOWITZ.